(12) United States Patent
Kong et al.

(10) Patent No.: US 11,628,810 B2
(45) Date of Patent: Apr. 18, 2023

(54) WASHER LIQUID HEATING DEVICE

(71) Applicants: Hyundai Motor Company, Seoul (KR); Kia Motors Corporation, Seoul (KR); DY AUTO Corporation, Chungcheongnam-do (KR)

(72) Inventors: Nak Kyoung Kong, Gyeonggi-do (KR); Jong Min Park, Gyeonggi-do (KR); Ki Hong Lee, Seoul (KR); Young Ik Cho, Gyeonggi-do (KR); Seung Hyeok Chang, Gyeonggi-do (KR); Jong Wook Lee, Chungcheongnam-do (KR); Jong Hyun Jin, Chungcheongnam-do (KR)

(73) Assignees: Hyundai Motor Company, Seoul (KR); Kia Motors Corporation, Seoul (KR); DY Auto CORP, Ansan (KR)

( * ) Notice: Subject to any disclaimer, the term of this patent is extended or adjusted under 35 U.S.C. 154(b) by 145 days.

(21) Appl. No.: 16/184,407

(22) Filed: Nov. 8, 2018

(65) Prior Publication Data

US 2020/0001831 A1    Jan. 2, 2020

(30) Foreign Application Priority Data

Jun. 27, 2018  (KR) .................. 10-2018-0074015

(51) Int. Cl.
*B60S 1/48* (2006.01)
*B60S 1/50* (2006.01)

(52) U.S. Cl.
CPC ............... *B60S 1/488* (2013.01); *B60S 1/481* (2013.01); *B60S 1/50* (2013.01)

(58) Field of Classification Search
None
See application file for complete search history.

(56) References Cited

U.S. PATENT DOCUMENTS

| | | | | |
|---|---|---|---|---|
| 3,888,412 A | * | 6/1975 | Lindo .................... | F16L 41/02 237/12.3 B |
| 4,090,668 A | * | 5/1978 | Kochenour ............ | B60S 1/481 15/250.04 |
| 5,509,606 A | * | 4/1996 | Breithaupt ............. | B60S 1/488 239/130 |
| 6,227,462 B1 | * | 5/2001 | Chen ...................... | B60S 1/487 239/135 |
| 6,615,438 B1 | * | 9/2003 | Franco ................... | B60S 1/482 15/250.02 |
| 7,313,322 B2 | * | 12/2007 | Starck ..................... | B60S 1/488 392/441 |
| 10,384,653 B2 | * | 8/2019 | Shank ...................... | B60S 1/50 |

(Continued)

FOREIGN PATENT DOCUMENTS

KR  10-2005-0121556 A  12/2005
KR  10-2011-0044303 A  4/2011

(Continued)

*Primary Examiner* — Thor S Campbell
(74) *Attorney, Agent, or Firm* — Fox Rothschild LLP

(57) ABSTRACT

A washer liquid heating device is provided. The device includes a heating unit that is positioned at a lower end of a reservoir. A washer pump is connected to one end of the heating unit and a controller adjusts a heat generation of the heating unit. Accordingly, at least some of washer liquid contained in the reservoir flows into the heating unit and is then discharged to the washer pump.

7 Claims, 4 Drawing Sheets

[ CROSS-SECTIONAL VIEW TAKEN ALONG LINE A-A]

(56) References Cited

U.S. PATENT DOCUMENTS

| | | | | |
|---|---|---|---|---|
| 2002/0137455 | A1* | 9/2002 | Ivanov | B60S 1/52 454/157 |
| 2007/0122127 | A1* | 5/2007 | Friedheim | F22B 1/28 392/401 |
| 2007/0157602 | A1* | 7/2007 | Gschwind | F02M 31/125 60/274 |
| 2007/0284457 | A1* | 12/2007 | Shank | B05B 9/002 239/135 |
| 2008/0277497 | A1* | 11/2008 | Shank | B60S 1/50 239/130 |
| 2009/0283605 | A1* | 11/2009 | Arkashevski | B60S 1/50 239/13 |
| 2012/0037606 | A1* | 2/2012 | Huang | F24H 1/009 219/201 |
| 2012/0055913 | A1* | 3/2012 | Huang | B60S 1/488 219/202 |
| 2013/0036570 | A1* | 2/2013 | Hartman | B60S 1/546 15/250.31 |
| 2016/0031420 | A1* | 2/2016 | Baik | H05B 3/26 219/202 |
| 2016/0031421 | A1* | 2/2016 | Baik | H05B 3/0014 219/202 |
| 2016/0167624 | A1* | 6/2016 | Lansinger | F24H 1/121 219/202 |
| 2017/0355352 | A1* | 12/2017 | Bulgajewski | B60S 1/52 |
| 2018/0072272 | A1* | 3/2018 | Dudar | B60S 1/0844 |
| 2018/0086317 | A1* | 3/2018 | Shank | B60S 1/487 |
| 2018/0319375 | A1* | 11/2018 | Weigle | B60S 1/481 |
| 2019/0176767 | A1* | 6/2019 | Ahn | B60S 1/481 |
| 2019/0275990 | A1* | 9/2019 | Agrotis | B60S 1/486 |

FOREIGN PATENT DOCUMENTS

| | | |
|---|---|---|
| KR | 10-2016-0014255 A | 2/2016 |
| KR | 10-2016-0014256 A | 2/2016 |

* cited by examiner

[ CROSS-SECTIONAL VIEW TAKEN ALONG LINE A-A]

WASHER LIQUID HEATING DEVICE

CROSS-REFERENCE TO RELATED APPLICATION

This application claims under 35 U.S.C. § 119(a) the benefit of priority to Korean Patent Application No. 10-2018-0074015 filed on Jun. 27, 2018, the entire contents of which are incorporated herein by reference.

BACKGROUND

(a) Technical Field

The present disclosure relates to a washer liquid heating device, and more particularly, to a washer liquid heating device that heats washer liquid flowing along a heating unit and ejects washer liquid at a particular temperature or greater via a washer liquid nozzle.

(b) Background Art

An important factor for safe driving of a vehicle is to secure a front visual field. Therefore, a conventional vehicle is equipped with a wiper device for removing foreign substances adhered to a surface of a windshield glass, and wiping rainwater or other fluids off the surface of the windshield glass to secure a forward visual field of a driver.

In addition to the above, the vehicle is provided with a washer liquid injecting device that ejects washer liquid onto the surface of the windshield glass to more easily remove foreign substances in the process of cleaning the surface of the windshield glass. In, the washer liquid-injecting device, washer liquid is stored in a reservoir to be pumped by a washer pump (a washer motor) and then ejected onto a glass surface through an injection nozzle. Generally, the ejection nozzle is disposed inside a cowl top or on a hood.

FIG. 1 is a schematic view showing a configuration of a conventional washer liquid-injecting device, and the washer liquid-injecting device includes a reservoir 1 in which washer liquid is stored, a washer pump 2 mounted on the reservoir 1 to pump washer liquid stored in the reservoir through a washer hose 3, and a washer nozzle 4 configured to eject washer liquid, which is pumped through the washer hose 3, to a surface of a windshield glass 5.

In this configuration, when a driver turns on an operation switch (e.g., a washer switch in a multifunction switch), the washer pump 2 is operated to pump washer liquid stored in the reservoir 1, and pumped washer liquid is ejected onto a surface of the windshield glass 5 through the washer nozzle 4. However, washer liquid may be frozen in a cold zone or at a low temperature condition, and a viscosity of washer liquid is increased as the temperature is decreased. In particular, when the viscosity of washer liquid is increased, an ejection defect of washer liquid may occur.

Therefore, as shown in FIG. 2, a heating device 6 that heats washer liquid may also be provided in the middle of the washer hose 3. The typical washer liquid heating device 6 includes a housing through which washer liquid that is pumped from the washer pump 2 to the injection nozzle 4 may pass. The housing has an inlet port and an outlet port to which the washer hoses provided at a front end and a rear end thereof are connected, respectively, to allow washer liquid to flow into the inlet port and be discharged from the outlet port. In addition, a heater rod is embedded in the housing to receive power and to generate heat based on a control signal from a controller.

Accordingly, washer liquid that is pumped by operation of the washer pump 2 is heated by the heater rod while passing through the inside of the housing of the heating device 6 disposed in the middle of the washer hose 3, and is then supplied to the injection nozzle 4 via the washer hose 3 again. In this configuration, when a driver turns on an operation switch, an electric power is applied to the heating device 6 and the washer pump 2 is simultaneously operated. In addition, since the heating device 6 heats washer liquid while washer liquid is pumped by the washer pump 2, heated washer liquid may be supplied to the injection nozzle 4 through the washer hose 3 to be ejected.

However, although since the heating device 6 is separated from the reservoir 1 and is installed in the middle of the washer hose 3, it is possible to heat washer fluid that is pumped through the washer hose, when a viscosity of washer liquid stored in the reservoir 1 is increased according to conditions such as a temperature and the like, the washer pump 2 mounted on the reservoir is unable to push washer liquid easily, and consequently, a location at which washer fluid reaches is poor due to the lowering of a discharge pressure of the washer pump. In other words, regardless of whether the heating device is provided, a lowering of the discharge pressure of the washer pump due to the increase of the viscosity of washer liquid, a deviation of location, at which washer fluid reaches, caused by the lowered discharge pressure, and a faulty wiping occur. Particularly, when the viscosity of washer liquid is increased, there is a possibility of carbonization of the washer pump (washer motor) due to an increase in an operational current of the washer pump 2. In addition to the above, carbonization of and damage to a contact of an operation switch (a washer switch in a multifunction switch) may occur.

The above information disclosed in this section is merely for enhancement of understanding of the background of the disclosure and therefore it may contain information that does not form the prior art that is already known in this country to a person of ordinary skill in the art.

SUMMARY

The present disclosure provides a washer liquid heating device in which a heating zone may be separated in a reservoir to provide more efficient a thermal performance. Additionally, the present disclosure provides a heat generating module in which a washer liquid flow passage may be formed in a zone separated into a housing cover and a housing, and heat transfer may be performed to washer liquid flowing along the separated flow passage in the reservoir.

The objects of the present disclosure are not limited to the above-mentioned objects, and other objects of the present disclosure which are not mentioned can be understood by the following description and can be more clearly understood by the embodiments of the present disclosure. Further, the objects of the present disclosure may be realized by the means shown in the claims and a combination thereof. A washer liquid heating device for achieving the above-mentioned objects of the present disclosure includes the following configuration.

The present disclosure provides a washer liquid heating device which may include a heating unit positioned at a lower end of a reservoir, a washer pump connected to one end of the heating unit, and a controller configured to adjust a heat generation of the heating unit, at least some of washer liquid contained in the reservoir may flows into the heating unit and then be discharged to the washer pump.

In addition, the heating unit may include a heat generating module connected to the controller and to heat washer liquid, a housing that surrounds the heat generating module, a housing cover that surrounds the housing and including a washer liquid flowing section formed therein, and a plurality of grommets configured to seal both ends of the housing cover which is positioned to pass through the reservoir. Furthermore, the heat generating module may include a heater section connected to the controller and a heat conduction cover configured to transfer heat generated by the heater section to the housing. The housing cover may include an inlet portion positioned at one end thereof, and the inlet portion may allow washer liquid contained in the reservoir to flow into the inside of the housing cover.

The housing may further include at least one or more ribs disposed at one end thereof facing the washer pump. The washer liquid heating device may also include an epoxy cover positioned between an inner side face of the housing and the heat conduction cover. In particular, the grommet may be configured to seal a position at which the housing meets the reservoir and a position at which the housing cover meets the reservoir.

BRIEF DESCRIPTION OF THE DRAWINGS

The above and other features of the present disclosure will now be described in detail with reference to exemplary embodiments thereof illustrated in the accompanying drawings which are given hereinbelow by way of illustration only, and thus are not limitative of the present disclosure, and wherein.

Figure 1:
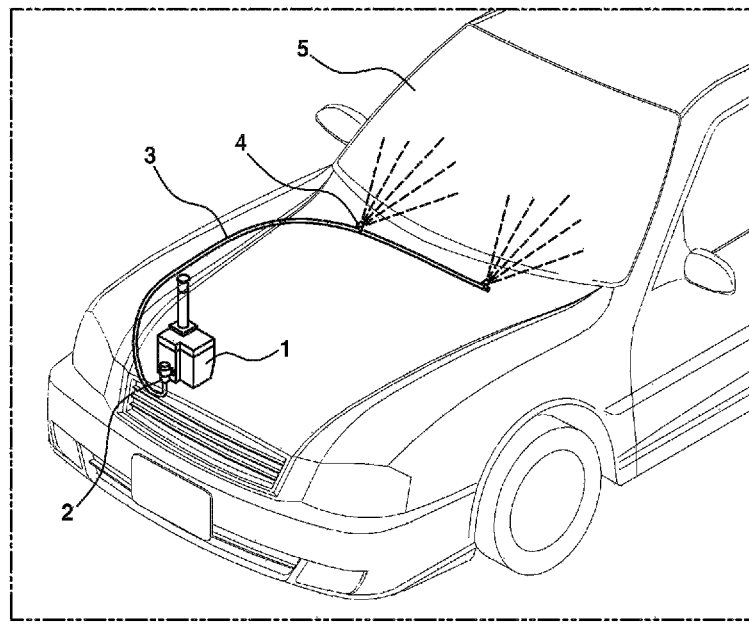
FIG. 1 is a schematic view showing a configuration of a conventional washer liquid-injecting device according to the related art.
Figure 2:
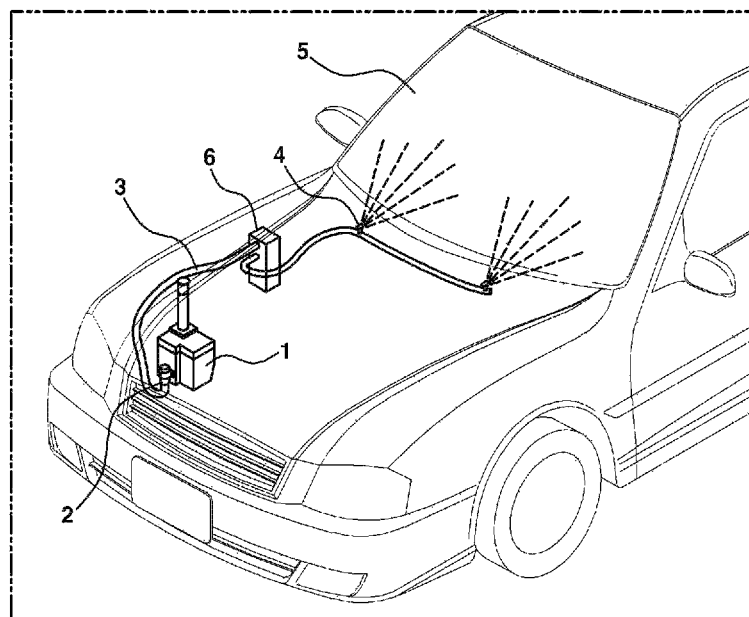
FIG. 2 is a schematic view showing a washer liquid-injecting device having a conventional heating device according to the related art.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. The exemplary embodiments of the present disclosure can be modified in various forms, and the scope of the present disclosure should not be construed as being limited to the following exemplary embodiments. These embodiments are provided to more fully explain the present disclosure to those skilled in the art. Also, the terms "~section", "~unit", "~module", and the like, which are mentioned in the specification, mean a unit for processing at least one function or operation, and can be implemented by a hardware, a software, or a combination of a hardware and a software.

The present disclosure is intended to provide a washer liquid heating device capable of improving the problems caused by an increase in a viscosity of washer liquid under a low temperature condition, and it is an object of the present disclosure to provide a washer liquid heating device capable of improving problems such as a decreasing of discharge pressure of a washer pump 110 due to an increase of a viscosity of washer liquid in a reservoir 100, a faulty supply of washer liquid, a deviation of location at which washer fluid reaches when ejected, a faulty wiping, a damage to the washer pump 100 and a damage to an operation switch.

Accordingly, a major feature of the present disclosure is that the washer liquid heating device may be integrally mounted to the reservoir 100 in which washer liquid is stored and may be configured to directly heat washer liquid through a heating unit 200 disposed at a lower end portion of the reservoir 100. In addition, the present disclosure provides the washer liquid heating device configured to heat only some region of the reservoir 100 in which washer liquid is contained, and provide a configuration for selectively heating washer liquid flowing along a housing 220 of the heating unit 200.

Figure 3:
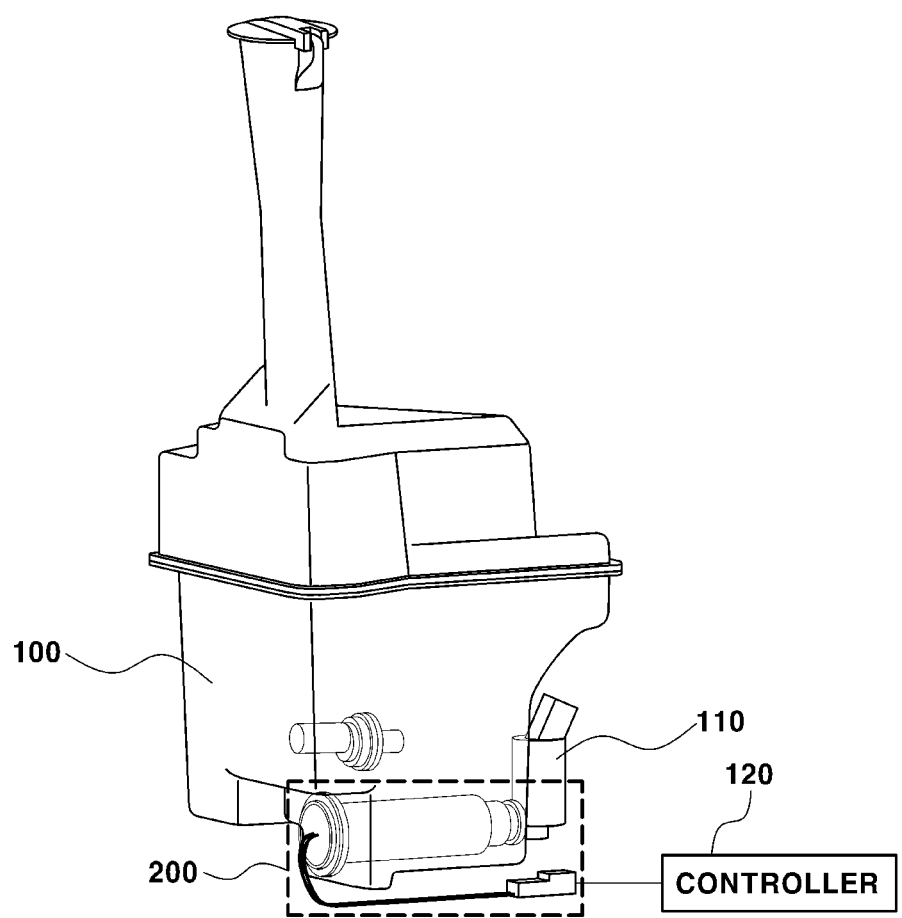
FIG. 3 is a structural view of a washer liquid heating device according to one exemplary embodiment of the present disclosure.
Figure 4:
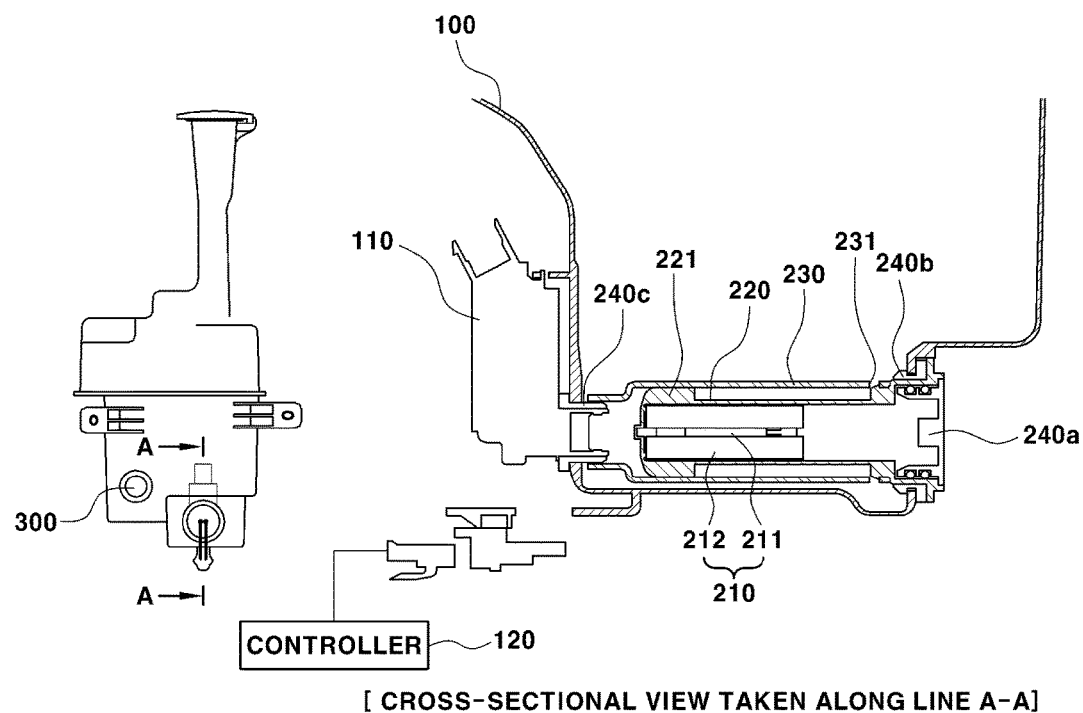
FIG. 4 is a cross-sectional view of the washer liquid heating device according to one exemplary embodiment of the present disclosure.

FIGS. 3 and 4 are perspective views showing the washer liquid heating device according to one exemplary embodiment of the present disclosure. Specifically, FIG. 3 is a view showing a configuration in which the washer liquid heating device according to one exemplary embodiment is mounted to a lower end of the reservoir 100, and FIG. 4 is a side sectional view of the reservoir 100. As illustrated, the washer liquid heating device of the present disclosure may include the reservoir 100 in which washer liquid is stored, and the washer pump 110 mounted at one end of the reservoir 100 and configured to apply a discharge pressure for discharging washer liquid.

Furthermore, the reservoir 100 may include an upper tank and a lower tank. In particular, the upper tank and the lower tank may be assembled vertically to form a closed inner space having a predetermined volume. In addition, the lower tank constituting the reservoir 100 may include a level sensor 300 configured to measure a level of washer liquid, and when washer liquid is insufficient, the user may be notified. For example, the controller in communication with the sensor may be configured to output a notification to the user regarding the insufficient washer liquid level. The upper tank may include an opening formed thereon to allow the reservoir to be filled with washer liquid, and the heating unit 200 may be mounted on a lower end of the lower tank.

The heating unit 200 may be disposed at the lower end of the reservoir 100, and may be configured to pass through the reservoir 100 in a widthwise direction of the reservoir 100. In particular, the heating unit 200 may positioned at the lowermost end of the reservoir 100 and some of washer liquid stored in the reservoir 100 may flow into the heating unit 200. The heating unit 200 may positioned to allow a first end thereof to face the washer pump 110 and may be configured to allow washer liquid passing the inside of the heating unit 200 to be discharged to a nozzle through the washer pump 110. A second end of the heating unit 200 may include a wiring and a connector connected to a controller 120 mounted within a vehicle.

Further, the present disclosure may include a sensor section (not shown) configured to measure a temperature of washer liquid and an ambient temperature sensor (not shown), and the controller 120 may be configured to set a driving time and a driving temperature of the heating unit 200 based on a temperature measured by the sensor. In one exemplary embodiment of the present disclosure, the controller 120 may be configured to set to drive the heating unit 200 when a value of the ambient temperature sensor is less than about −5° C. and to stop a driving of the heating unit 200 when driving time of the heating unit 200 is about 10 minutes or more and an ambient temperature is about 0° C. or more.

Another exemplary embodiment of the present disclosure may be configured to drive or operate the heating unit 200 through a manual operation of a user. The illustrated heating unit 200 may include a heat generating module 210 connected to the controller 120, the housing 220 configured to surround the heat generating module 210, and a housing cover 230 configured to surround or enclose the housing 220 for forming a flow passage for washer liquid.

In addition, the heating unit may include a plurality of grommets 240 that seal the heating unit 200, the reservoir 100 and the washer pump 110. In particular, the grommets may include a housing grommet 240a positioned at one end of the housing 220 connected to the controller 120 to prevent foreign substances from entering the reservoir 100, a reservoir grommet 240b configured to perform a sealing between the reservoir 100 and the housing cover 230, and a pump grommet 240c configured to seal a position where the washer pump 110 and the housing cover 230 face each other. In summary, washer liquid flowing into the heating unit 200 through an inlet portion 231 positioned in the housing cover 230 may be positioned in a flow passage formed between the housing 220 and the housing cover 230, and washer liquid positioned in the flow passage may be heated by heat transfer performed along the housing 220 and then may be discharged to the washer pump 110.

Figure 5:
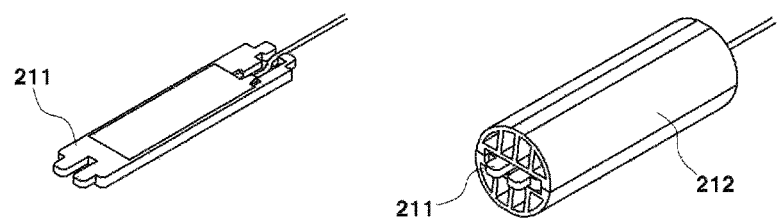
FIG. 5 is a structural view of a heater section and a heat generating module according to one exemplary embodiment of the present disclosure.

FIG. 5 is a structural view of a heater section 211 and a heat conduction cover 212 that surrounds the heater section 211, which operate as the heat generating module 210. As illustrated, the heat generating module 210 inserted into an inner side face of the housing 220 may include the heater section 211 and the heat conduction cover 212. The heater unit 211 may be directly connected to and operated by the controller 120, and may be employed as a heat generating device based on a temperature set value of the controller 120.

In one exemplary embodiment of the present disclosure, the heater section 211 may include a central positive temperature coefficient (PTC) heater and metal electrodes disposed on both faces of a base member, and the heater section 211 may be wire-connected to the power source. In the heater section 211, power from a power source disposed within the vehicle outside the housing 220 may be applied to the positive temperature coefficient heater, and thus, the positive temperature coefficient heater may be driven to generate heat. In addition, the heat conduction cover 212 may surround the heater section 211 and the heat conduction cover may be made of a metal material capable of smoothly transferring the heat generated by the heater section 211. For example, the heat conduction cover 212 may be made of aluminum (Al).

The heat conduction cover 212 may be configured such that the heater section 211 may be inserted into a central portion of the heat conduction cover. In this configuration, when the heater section 211 is operated to generate heat, heat generated by the heater section 211 may be transferred in a radial direction of the heat conduction cover 212. Furthermore, the heat conduction cover 212 may be configured to transfer heat generated by the heater section 211 to the housing 220 positioned to surround an outside of the heat conduction cover 212, and may be configured to allow heat transferred to an outside of the housing 220 to heat washer liquid passing between the housing 220 and the housing cover 230. Washer liquid passing between the housing 220 and the housing cover 230 and heated may be discharged through the washer pump 110 and ejected to a windshield glass through a nozzle section.

Figure 6:
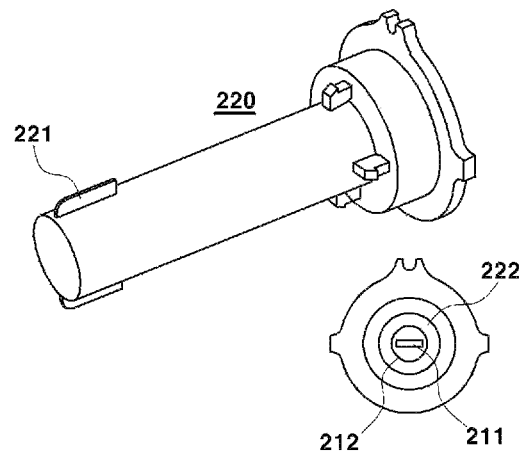
FIG. 6 is a view illustrating a state in which a housing and a heat conduction cover according to one exemplary embodiment of the present disclosure are coupled.

FIG. 6 is a view illustrating a configuration of the housing 220 configured to allow the heat generating module 210 to be inserted thereinto. The illustrated housing 220 of the present disclosure may allow a central portion to be concavely dented, and the heat generating module 210 may be inserted into the central portion which is concavely dented. In particular, the dented central portion may be formed in a cylindrical shape and may have a space formed therein to allow the heat generating module 210 to be inserted into the space.

An epoxy cover 222 made of epoxy resin may be formed at the depressed central portion to perform dustproof and waterproof functions for the inserted heat-generating module 210, and the heat-generating module 210 may be fixed to the dented portion of the housing 220. In addition, the housing grommet 240a may be positioned at one opened end of the housing 220, and the housing grommet may be configured to seal the heat generating module 210 to prevent foreign substances and the like outside the reservoir 100 from entering the housing.

In summary, the heat generating module 210 may be inserted into one opened end of the housing 220, and the opened end of the housing may be doubly sealed by the epoxy cover 222 and the grommet 240. The illustrated housing 220 may include at least one or more ribs 221 formed thereon to improve a flow performance of washer liquid flowing between the housing 220 and the housing cover 230. According to one exemplary embodiment of the present disclosure, the housing 220 may include the ribs 221 configured to be symmetric with each other with respect to the dent portion of the housing 220.

Particularly, the ribs 221 of the present disclosure may be disposed at the one end of the housing 220 facing the washer pump 110, and may guide washer liquid, which flows into the inlet portion 231 of the housing cover 230 from the reservoir 100, to flow along the washer pump 110. The rib 221 of the present disclosure may have a predetermined angle in a longitudinal direction of the housing 220, or may be formed in a blade shape having a particular curvature. In addition, the rib may be configured to increase flow rate of and to improve a flow performance of discharged washer liquid when washer liquid flowing into a flow passage space formed inside the heating unit 200 is discharged to the washer pump 100.

In another exemplary embodiment of the present disclosure, the rib 221 positioned at the first end of the housing 220 may have a particular curvature, and may be configured to generate a vortex of washer liquid which discharged to the washer pump 110. As described above, the ribs 221 of the present disclosure may improve the flow performance of washer liquid to increase a discharge pressure of washer liquid discharged to the washer pump 110.

Figure 7:
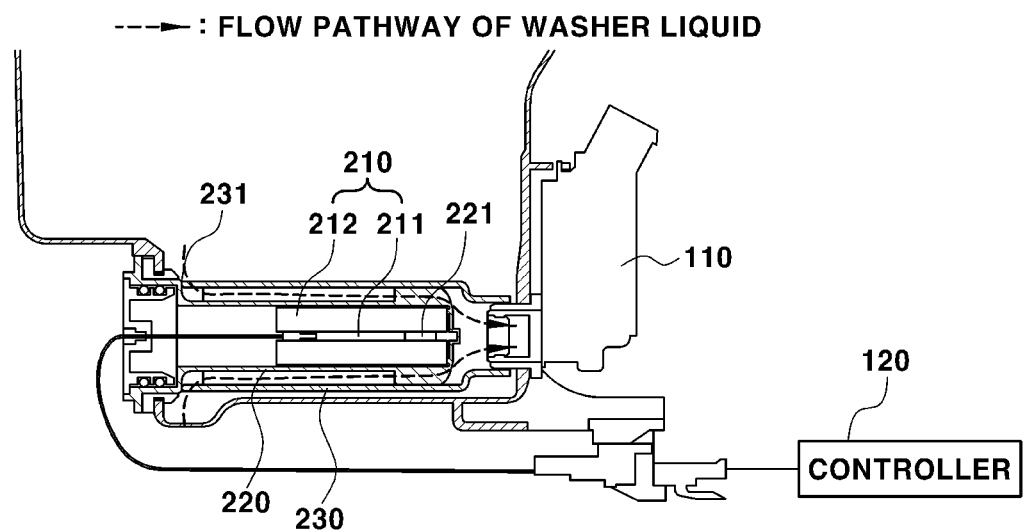
FIG. 7 is a view illustrating a flow pathway of washer liquid contained in a reservoir according to one exemplary embodiment of the present disclosure.

As one exemplary embodiment of the present disclosure, FIG. 7 shows a flow along which washer liquid contained in the reservoir 100 flows into the heating unit 200. As illustrated, washer liquid contained in the reservoir 100 may flow into the heating unit 200 via the inlet portion 231 of the housing cover 230. More specifically, at least one or more inlet portions 231 may be provided to the housing cover 230, and may be configured to allow washer liquid flowing into the heating unit 200 therethrough to occupy a volume which is about 5% to 30% of the entire volume of the reservoir 100.

Therefore, the washer liquid heating device of the present disclosure may be configured to not heat entire washer liquid contained in the reservoir 100, and to heat some of washer liquid positioned between the housing 220 and the housing cover 230. As a result, it may be possible to rapidly provide heated washer liquid according to a user's request. Additionally, washer liquid flowing into the heating unit 200 through the inlet portion 231 positioned farther away from the washer pump 110 may flow to one end, which is adjacent to the washer pump 110, along the housing 220 to which heat is applied from the heater unit 211.

At least one or more ribs 221 may be formed at the end of the housing 220 near the washer pump 110 to improve the flow performance of washer liquid flowing into the heating unit 200. In addition, heat generation may be by the controller, and in one exemplary embodiment of the present disclosure, the controller 120 may be configured to apply power to the heater section 211 based on the ambient temperature. In another exemplary embodiment, the controller may be configured to operate the heater section 211 with respect to the temperature of washer liquid.

The present disclosure may obtain the following effects using a combination of and a usage relation between the configuration of the above-described exemplary embodiment and a configuration described above. Since the washer liquid flow passage may be formed to allow washer liquid flowing into the washer pump to flow along the heating unit, the present disclosure has an effect of maximizing the heat transfer efficiency.

Further, the housing cover of the heating unit may be positioned to be matched with the injection port of the washer pump, and thus, the present disclosure provides the device for heating washer liquid without loss of washer liquid. In addition to the above, the present disclosure may provide washer liquid heated under a condition of a particular temperature or less, and thus, a load applied to the washer pump may be increased depending on washer fluid in a low temperature condition.

The foregoing detailed description illustrates the present disclosure. Furthermore, the foregoing is intended to illustrate and explain the exemplary embodiments of the present disclosure, and the present disclosure may be used in various other combinations, modifications, and environments. In other words, it may be possible to make changes or modifications within the scope of the concept of the disclosure disclosed in the present specification, equivalents to the disclosure and/or the scope of the art or knowledge of the art to which the present disclosure pertains. The above described exemplary embodiments are intended to be illustrative of the best mode for carrying out the technical idea of the present disclosure and various changes required in the specific applications and uses of the present disclosure may be made. Therefore, the detailed description of the disclosure is not intended to limit the disclosure to the disclosed exemplary embodiments. It is also to be understood that the appended claims are intended to cover further exemplary embodiments.

What is claimed is:

1. A washer liquid heating device, comprising:
   a heating unit positioned at a bottom of a reservoir, the heating unit comprising:
     a heat generating module connected to a controller and configured to heat washer liquid;
     a housing having a central portion that is concavely dented and that surrounds the heat generating module;
     a housing cover that surrounds the housing and includes a washer liquid flowing section formed between the housing and the housing cover; and
     a washer pump connected to a first end of the heating unit; and
   a level sensor located above the heating unit;
   wherein the controller is configured to adjust a heat generation of the heating unit,
   wherein the heat generating module is inserted into the central portion which is concavely dented;
   wherein the housing includes at least one rib placed at the first end thereof facing the washer pump and having a predetermined angle in a longitudinal direction of the housing, and wherein the at least one rib contacts the housing cover;

wherein at least some of washer liquid contained in the reservoir flows into the heating unit via an inlet portion and is discharged to the washer pump, wherein the inlet portion is positioned on an opposite end of the heating unit away from the washer pump, and wherein the heat generating module includes:
 a heater section connected to the controller; and
 a heat conduction cover configured to transfer heat generated by the heater section to the housing.

2. The washer liquid heating device of claim 1, wherein the heating unit further includes:
 a plurality of grommets that seal both ends of the housing cover which is positioned to pass through the reservoir.

3. The washer liquid heating device of claim 1, wherein the housing cover includes an inlet portion positioned at one end thereof, and the inlet portion allows washer liquid contained in the reservoir to flow into the inside of the housing cover.

4. The washer liquid heating device of claim 1, further comprising:
 an epoxy cover positioned to seal an inner side face of the housing and the heat generating module.

5. The washer liquid heating device of claim 2, wherein the grommet seals a position at which the housing meets the reservoir and a position at which the housing cover meets the reservoir.

6. The washer liquid heating device of claim 1, wherein a second end of the heating unit includes a connector connected to the controller.

7. The washer liquid device of claim 1, wherein the washer liquid heating device is mounted within a vehicle.

* * * * *